(12) United States Patent
Ganesan et al.

(10) Patent No.: US 11,806,749 B2
(45) Date of Patent: Nov. 7, 2023

(54) ULTRASONIC TRANSDUCER FOR FLOW MEASUREMENT

(71) Applicant: Baker Hughes, a GE Company, LLC, Houston, TX (US)

(72) Inventors: Baskaran Ganesan, Billerica, MA (US); Navin Sakthivel, Houston, TX (US); Aaron Avagliano, Houston, TX (US)

(73) Assignee: Baker Hughes, a GE Company, LLC, Houston, TX (US)

( * ) Notice: Subject to any disclaimer, the term of this patent is extended or adjusted under 35 U.S.C. 154(b) by 65 days.

(21) Appl. No.: 17/513,687

(22) Filed: Oct. 28, 2021

(65) Prior Publication Data
US 2023/0134074 A1    May 4, 2023

(51) Int. Cl.
*B06B 1/06* (2006.01)
*G01F 1/66* (2022.01)

(52) U.S. Cl.
CPC .............. *B06B 1/06* (2013.01); *B06B 1/0611* (2013.01); *B06B 1/0618* (2013.01); *G01F 1/666* (2013.01); *G01F 1/662* (2013.01)

(58) Field of Classification Search
CPC ....... B06B 1/06; B06B 1/0611; B06B 1/0618; G01F 1/666; G01F 1/662
(Continued)

(56) References Cited

U.S. PATENT DOCUMENTS 4,544,859 A * 10/1985 Eoff ...................... B06B 1/0651
                                                                310/800
4,841,977 A *  6/1989 Griffith .................... A61B 8/12
                                                                29/25.35
(Continued)

FOREIGN PATENT DOCUMENTS

DE         19623071 C2 *  7/1998  ........... B06B 1/0651
DE         10297480 T5 *  2/2005  ............. H04R 31/00
(Continued)

OTHER PUBLICATIONS

Sandro Miqueleti et al., Acoustic impedance measurement method using spherical waves, Labroatory of Ultrasound, National Institute of Metrology, Quality, and Technology (INMETRO), https://ssrn.com/abstract=4397076, Mar. 2023, 17 pg(s) (Year: 2023).*
(Continued)

*Primary Examiner* — Stephanie E Bloss
*Assistant Examiner* — Kevin C Butler
(74) *Attorney, Agent, or Firm* — MINTZ LEVIN COHN FERRIS GLOVSKY AND POPEO, PC

(57) ABSTRACT

An ultrasonic transducer is provided. The ultrasonic transducer can be configured for flow metering applications and can include a head mass, a tail mass, and a spanning element joining the head mass with the tail mass. At least one cavity can be created in the head mass, tail mass, or spanning element using additive manufacturing. A method of manufacturing is also provided. The method of manufacturing can include forming a head mass utilizing a first process of additive manufacturing. The method of manufacturing can also include forming a tail mass utilizing a second process or additive manufacturing. The method of manufacturing can further include joining the head mass and the tail mass by a spanning element.

14 Claims, 5 Drawing Sheets

(58) Field of Classification Search
USPC .......................................................... 310/334
See application file for complete search history.

(56) References Cited

U.S. PATENT DOCUMENTS

| | | | | |
|---|---|---|---|---|
| 6,085,599 | A * | 7/2000 | Feller | G01F 1/588 |
| | | | | 73/861.15 |
| 6,371,915 | B1 * | 4/2002 | Koger | G10K 11/02 |
| | | | | 29/25.35 |
| 7,954,387 | B1 * | 6/2011 | Furlong | G01F 1/74 |
| | | | | 73/861.28 |
| 2011/0118995 | A1 * | 5/2011 | Berger | B06B 3/00 |
| | | | | 702/48 |
| 2015/0219650 | A1 * | 8/2015 | Viovy | B03C 1/288 |
| | | | | 435/7.1 |
| 2016/0061640 | A1 * | 3/2016 | Joshi | G01F 15/18 |
| | | | | 73/197 |
| 2020/0103262 | A1 * | 4/2020 | Straub, Jr. | B06B 1/0622 |

FOREIGN PATENT DOCUMENTS

| | | | | | |
|---|---|---|---|---|---|
| DE | 102004063707 | A1 * | 7/2005 | | B06B 1/0292 |
| DE | 102004059524 | A1 * | 6/2006 | | B06B 1/06 |
| DE | 102007027277 | A1 * | 12/2008 | | G10K 11/02 |
| DE | 102007042663 | A1 * | 3/2009 | | G10K 11/02 |
| DE | 102008029772 | A1 * | 12/2009 | | G01F 1/662 |
| DE | 102011090079 | A1 * | 7/2013 | | G01F 1/667 |
| DE | 102012003495 | A1 * | 8/2013 | | B06B 1/0607 |
| DE | 102013104544 | B4 * | 3/2015 | | G01F 1/662 |
| DE | 112010006058 | B4 * | 3/2017 | | G01S 7/521 |
| DE | 102016115199 | A1 * | 2/2018 | | |
| DE | 102016115199 | A1 | 2/2018 | | |
| EP | 0118837 | A2 * | 2/1984 | | G10K 11/02 |
| EP | 1615203 | A1 * | 1/2006 | | G10K 11/004 |
| EP | 3196601 | A1 * | 7/2017 | | G01F 1/662 |
| JP | 2001149371 | A * | 6/2001 | | |
| WO | WO-2008152058 | A1 * | 12/2008 | | G10K 11/02 |
| WO | WO-2009156250 | A1 * | 12/2009 | | G01F 1/662 |
| WO | WO-2014177411 | A1 * | 11/2014 | | G01F 1/662 |

OTHER PUBLICATIONS

Hiremath et al., An Overview of Acoustic Impedance Measurement Techniques and Future Prospects, Metrology 2021, 1, 17-38. https://doi.org/10.3390/metrology1010002 (Year: 2021).*
Fabian Bause et al., Design, modeling and identification of an ultrasonic composite transducer for target impedance independent short pulse generation, AMA Conferences 2013—Sensor 2013, OPTO 2013, IRS 2 2013 (Year: 2013).*
Ed Ginzel et al., Impedance Matching Polymers, The e-Journal of Nondestructive Testing, Apr. 15, 2021, 8 pg(s) (Year: 2021).*
Yi Zhang, Measuring Acoustic Attenuation of Polymer Materials Using Drop Ball Test, Embry-Riddle Aeronautical University/Dissertations and Theses—Daytona Beach, Apr. 2013, 121 pg(s) (Year: 2013).*
Michael G. Jones et al., Evaluation of a Multi-Point Method for Determining Acoustic Impedance, NASA Technical Memorandum 1 0 0 6 3 7, Aug. 1, 1988, 36 pg(s) (Year: 1988).*
PhD Anders Dahl Henriksen, Magnetic manipulation and sensing of beads for bioapplications, DTU Nanotech Departimentof Micro- and Nanotechnology, Aug. 14, 2015, 175 pg(s) (Year: 2015).*
Eriola-Sophia Shanko et al, Magnetic bead mixing in a microfluidic chamber induced by an in-plane rotating magnetic field, Microfluidics and Nanofluidics (2022) 26:17 https://doi.org/10.1007/s10404-022-02523-5, 12 pg(s) (Year: 2022).*
I. Iranmanesh et al., Acoustic Micro-Vortexing of Fluids, Beads and Cells in Disposible Microfluidic Chips, 19th International Conference on Miniaturized Systems for Chemistry and Life Sciences Oct. 25-29, 2015, Gyeongju, Korea, 3 pg(s) (Year: 2015).*
Hyungbeen Lee et al., Highly-efficient microfluidic ultrasonic transducers assisted gDNA extraction system in whole blood for POCT applications, Sensors & Actuators: B. Chemical 319 (2020) 128317, 9 pg(s) (Year: 2020).*
Harper et al., "Field Experience of Ultrasonic Flow Meter Use in CO2-Rich Applications", SICK Inc., 1-15.
Kang et al., "Flow measurement based on two-dimensional flexural ultrasonic phased arrays", Proceedings of Meetings on Acoustics, 2017, 1-6.

* cited by examiner

ULTRASONIC TRANSDUCER FOR FLOW MEASUREMENT

FIELD OF THE INVENTION

The present invention relates to an ultrasonic transducer for measuring fluid flow.

BACKGROUND OF THE INVENTION

Ultrasonic flow meters are used in a wide variety of applications for measuring volume or mass flow of a fluid, such as a liquid or a gas, through a pipe or other conduit in a defined flow direction. Ultrasonic flow meters use sound waves at a frequency beyond the range of hearing (typically 0.5, 1, or 4 MHz). This ultrasound signal is sent into a stream of flowing liquid by using wetted (insertion) transducers that make direct contact with the liquid or external (clamp-on) transducers that send the ultrasound through the pipe wall.

A typical transit-time ultrasonic liquid flow meter utilizes two ultrasonic transducers that function as both ultrasonic transmitter and receiver. The ultrasonic flow meter operates by alternately transmitting and receiving a burst of ultrasound between the two transducers by measuring the transit time that it takes for sound to travel between the two transducers in both directions. The difference in the transit time (Δ time) measured is directly proportional to the velocity of the liquid in the pipe.

Conventional transducer design involves bonding of piezoelectric crystals, impedance matching material, and backing material. The energy that is transmitted from the transducer is controlled by the type of piezoelectric crystals, excitation voltage and interface quality between the components of the transducer and the medium being monitored. The multilayered design does not allow for efficient energy transfer from the piezoelectric crystals to the fluid measurement medium.

SUMMARY OF THE INVENTION

In one aspect an ultrasonic transducer suitable for use in flow meters and other applications is provided having a head mass formed of a first material and a tail mass formed of a second material. A spanning element connects the head mass and the tail mass. At least one piezo crystal can be positioned along the spanning element. In some aspects the head mass, tail mass, or element includes at least one cavity. The ultrasonic transducer can include a shell surrounding the head mass. In some aspects, the at least one cavity can include a plurality of concentric cavities. In some aspects, the head mass can include a conical shape having a distal diameter greater than a proximal diameter. In some aspects, the spanning element can include a bolt located within the at least one piezo crystal. In some aspects, the spanning element can include a bolt located outside of the at least one piezo crystal. In some aspects, at least one of the head mass and the tail mass can include a protrusion for receiving a bolt or other spanning element. In some aspects, the first material of the head mass can be different from the second material of the tail mass. In some aspects, the head mass can be formed from a first material using a first process of additive manufacturing, and the tail mass can be formed from a second material using a second process of additive manufacturing.

In another aspect an ultrasonic transducer suitable for use in flow meters and other applications is provided having a head mass and a tail mass. A spanning element can connect the head mass and the tail mass. The ultrasonic transducer can also include at least one piezo crystal positioned along the spanning element. The head mass can be configured to have a first configuration and a second configuration different from the first configuration. In some aspects, the ultrasonic transducers can include a shape changing element associated with the head mass, wherein the first configuration can be at a first temperature and the second configuration can be at a second temperature. In some aspects, the head mass can include a fluid and magnetic particles dispersed within the fluid, wherein the first configuration comprises the magnetic particles aligned and the second configuration comprises the magnetic particles unaligned.

A method of making an ultrasonic transducer suitable for use in flow meters and other applications can include forming a head mass utilizing a first process of additive manufacturing. The method can also include forming a tail mass utilizing a second process or additive manufacturing and joining the head mass and the tail mass by a connecting element.

BRIEF DESCRIPTION OF THE DRAWINGS

The invention will be more fully understood from the following detailed description taken in conjunction with the accompanying drawings, in which.

DETAILED DESCRIPTION

Certain exemplary embodiments will now be described to provide an overall understanding of the principles of the structure, function, manufacture, and use of the devices and methods disclosed herein. One or more examples of these embodiments are illustrated in the accompanying drawings. Those of skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

The present subject matter focuses on an ultrasonic transducer design suitable for use in a flow meter or other application. The transducer plays an important role in the ultrasonic flow meter system. A simple bonding process design uses a metallic mass spring resonance system with 3D printed or Additive Manufacturing components to obtain an optimum signal transmission and bandwidth for a specific application. For example, the head and tail masses are 3D printed for tuning the optimum transducer performance for flow metering applications. The arrangement of piezoelectric crystal rings and the head and tail masses increase the piezo conversion efficiency and maximize the energy transfer with less excitation voltage. This arrangement allows for an increase in the bandwidth, and tuning of the bandwidth based on the requirements without having additional backing material which allows for the reduction in the length of the transducer as compared to conventional ultrasonic transducers.

Figure 1:
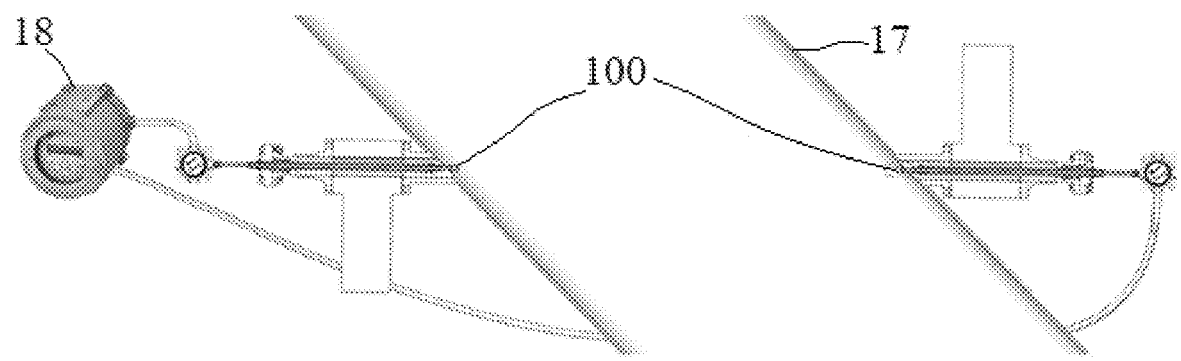
FIG. 1 is an illustration of an ultrasonic transducer for flow measurement in accordance with a first embodiment.

FIG. 1 illustrates a flow meter utilizing an ultrasonic transducer 100 in accordance with a first embodiment. In some embodiments, the ultrasonic transducer 100 can be a port-less wetted transducer mounted within a pipe 17 for measuring a flow of fluid medium therein, such as a liquid or gas. The ultrasonic transducer 100 can include an overall diameter less than 1 in. A tapered head mass can be used as a sound guide to provide an acoustic impedance match between a sound source, such as piezoelectric crystals, and the fluid medium. The head mass can be bonded to the piezoelectric crystals by an epoxy or other suitable adhesive. The tapered head mass can maximize the efficiency with sound waves transferred to the medium. Thus, the design provides low power consumption, high energy transfer, and more accurate and stable signals with improved bandwidth or tuning bandwidth. The design allows for improved meter accuracy and stability, and fewer burdens on signal processing methods. One or more ultrasonic transducers 100 can be installed in the pipe 17 and can send sound pulses upstream and downstream through the fluid. The difference in transit times between the transducers can be by the processing system 18 to determine velocity, and volumetric and mass flow rate of the fluid.

In order to amplify the output of the transducer, a tail mass may be joined to the ultrasonic transducer 100 by a spanning element as discussed below. Various materials can be used to form the various components of transducer 100 including the head mass, tail mass, or spanning element. Various materials for forming the components of the transducer 100 can include one or more of a High Temperature SLA Resin, ULTEM (polyetherimide), PEEK (polyether ether ketone), Ecofloat, Stycast, Nonconductive Epoxy Resin, Tungsteen, Bronze, Tungsten Carbide, Stainless Steel 316, Nickel, Cast Iron, Titanium, Aluminum Oxide, Titanium Dioxide, and Silicon Carbide.

Figure 2A:
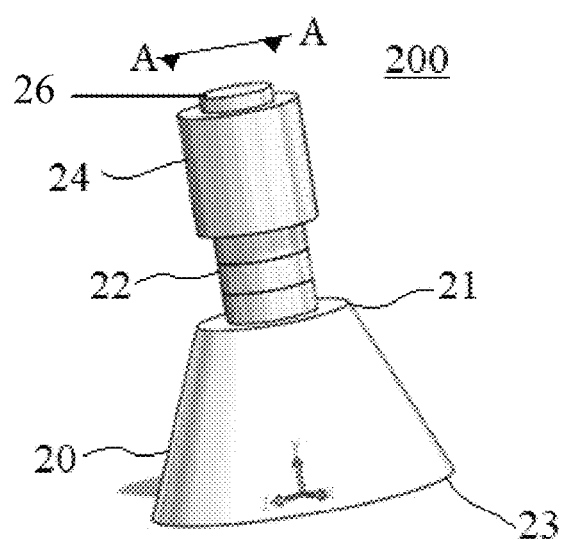
FIG. 2A is a perspective view of an ultrasonic transducer for flow measurement in accordance with a second embodiment.

FIG. 2A illustrates an ultrasonic transducer 200 having a head mass 20, a tail mass 24, and a connecting element 26. The head mass 20 can have a conical shape tapering from a smaller diameter proximal portion 21 to a larger diameter distal portion 23. The head mass 20 can be made of a first material, such as any material described above, or a combination thereof. The tail mass 24 can have a constant diameter outer surface. However, in other embodiments, the tail mass 24 can include a tapered conical portion such as shown with the head mass 20. The tail mass 24 can be formed from a second material, such as any material described above, or a combination thereof. In some embodiments, the material forming the head mass 20 can be different from the material forming the tail mass 24. In some embodiments, the materials forming the head mass 20 and the tail mass 24 are the same.

The head mass 20 and the tail mass 24 are connected to one another by a spanning element 26 that extends between the head mass 20 and the tail mass 24. In some embodiments, the spanning element 26 can be configured to extend through an aperture located in both the head mass 20 and the tail mass 24 to secure the head mass 20 and the tail mass 24. In such an instance, the spanning element 26 can be a bolt. In some embodiments, the bolt can include a larger diameter distal portion and a threaded proximal portion that can secure to internal threads within the tail mass 24. Alternatively, the bolt can be configured to secure to internal threads within the head mass 20. Additionally, the spanning element 26 may be configured to extend proximally beyond the tail mass 24 and connect with a threaded element such as a bolt. Piezoelectric crystals 22 can be formed as one or more rings having an opening in the middle through which the spanning element 26 may pass.

Figure 2B:
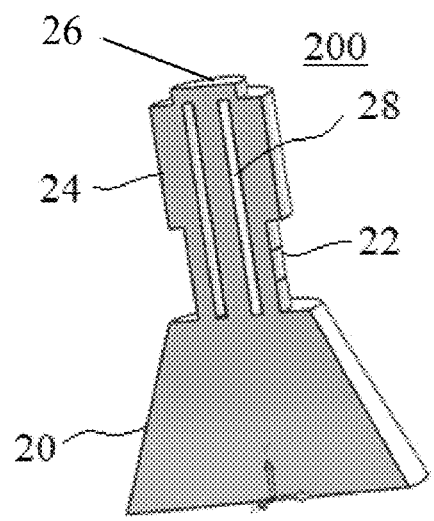
FIG. 2B is a cross-sectional view taken along line A-A of FIG. 2A of the ultrasonic transducer for flow measurement.

FIG. 2B illustrates a cross-sectional view of the ultrasonic transducer 200 of FIG. 2A taken along line A-A. As shown in FIG. 2B, the ultrasonic transducer 200 can include one or more hollow spaces or voids 28. These hollow spaces 28 can be located in any portion of the transducer 200, for example the head mass 20, tail mass 24, or spanning element 26. The hollow space 28 shown in FIG. 2B can be a cylindrical hollow space extending between the spanning element 26 and the tail mass 24. While the hollow space 28 is shown in the spanning element 26 and the tail mass 24, it is understood that one or more hollow spaces 28 could be formed in the head mass 24. The hollow spaces 28 are formed during an Additive Manufacturing process.

Additive Manufacturing processes used for the formation of the components of the ultrasonic transducer 200 can include Fused Deposition Modeling (FDM), Stereolithography (SLA), Direct Ink Writing (DIW), Powder Bed Fusion (PBF), Aerosol Jetting (AJ), and Lithography. For example, the housing and the connecting element can be formed using Powder Bed Fusion, solder joints can be formed by using Aerosol Jetting, the head mass and the tail mass can be formed using Fused Deposition Modeling, Stereolithography, Direct Ink Writing, or Powder Bed Fusion, and the piezo rings or discs can be formed using Direct Ink Writing and Lithography.

The hollow spaces 28 can include any shape, such as a plurality of concentric cylindrical hollow spaces, a honeycomb structure, or other mesh structure having a plurality of interwoven hollow spaces. The hollow spaces 28 are designed to reduce the overall mass of the transducer 200 components, which allows for specific tuning of the transducer 200 for use at or over a desired frequency range.

Figures 3A, 3B, 3C:
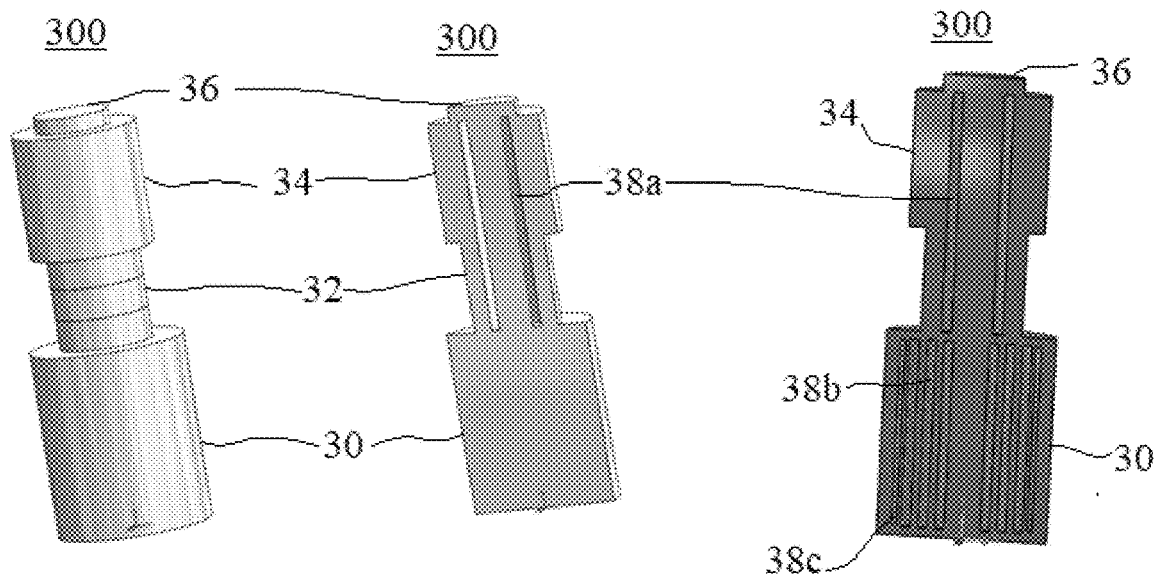
FIG. 3A is a perspective view of an ultrasonic transducer for flow measurement in accordance with a third embodiment.
FIG. 3B is a cross-sectional view taken along line A-A of FIG. 3A of the ultrasonic transducer for flow measurement illustrating a first internal arrangement.
FIG. 3C is a cross-sectional view taken along line A-A of FIG. 3A of the ultrasonic transducer for flow measurement illustrating a second internal arrangement.

FIG. 3A illustrates another embodiment of an ultrasonic transducer 300 having a head mass 30, a tail mass 34, and a connecting element 36. The head mass 30 can have a cylindrical shape having a constant diameter outer surface. The head mass 30 can be made of a first material, such as any material described above, or a combination thereof. The tail mass 34 can also have a constant diameter outer surface. In some embodiments, the tail mass 34 can include a tapered conical portion having a reduced diameter in either the proximal or distal direction. The tail mass 34 can be from a second material, such as any material set forth above, or a combination thereof. In some embodiments, the material forming the head mass 30 can be different from the material forming the tail mass 34. In some embodiments, the materials forming the head mass 30 and the tail mass 34 are the same. In some embodiments, the head mass 30 can be formed using a first Additive Manufacturing process and the tail mass 34 can be formed using a second Additive Manufacturing process.

The head mass 30 and the tail mass 34 are connected to one another by a spanning element 36 that can extend between the head mass 30 and the tail mass 34. In some embodiments, the spanning element 36 can be configured to extend through an aperture located in both the head mass 30 and the tail mass 34 to secure the head mass 30 and the tail mass 34. The spanning element 36 can include a bolt that includes a larger diameter distal portion and a threaded proximal portion that can secure to internal threads within the tail mass 34. Alternatively, the bolt can be configured to secure to internal threads within the head mass 30.

Piezoelectric crystals 32 can be formed as one or more rings having an opening in the middle through which the spanning element 36 may pass. In some embodiments, one or more components of the transducer 300 are integrally formed in one piece. For example, the tail mass 34 and the spanning element 36 may be formed together using an Additive Manufacturing process. In such a configuration, the piezoelectric discs 32 may be placed over the spanning element 36 prior to connecting the spanning element 36 with the head mass 30. The connection can be made by a treaded feature associated with either the spanning element 36 or the head mass 30, or by bonding using epoxy or other bonding agents. In another embodiment, the head mass 30, spanning element 36, and tail mass 34 can be integrally formed using an Additive Manufacturing process. In such a configuration, the piezoelectric discs 32 can be cut at one or more locations to be placed around the spanning element 26 and bonded thereto.

As shown in FIGS. 3B and 3C, the ultrasound transducer 300 can include one or more hollow spaces 38a, 38b, 38c. The one or more hollow spaces 38a, 38b, 38c can be located in any portion of the ultrasound transducer 300. The one or more hollow spaces 38a, 38b, 38c can allow the mass of the transducer 300 to be reduced. The one or more hollow spaces 38a, 38b, 38c can be configured with respect to a specific application or use of the transducer 300 to a desired use. For example, when configured as a gas flow meter, the transducer 300 may be tuned to work at a frequency between 100 kHz and 50 kHz. As shown in FIG. 3B, the hollow spaces 38a can be located in the tail mass 34 and the spanning element 36. FIG. 3C shows additional hollow spaces 38b, 38c formed in the head mass 30. The hollow spaces 38a, 38b, 38c can be formed during the additive manufacturing process. The hollow spaces 38a, 38b, 38c can include any shape, such as a plurality of concentric cylindrical hollow spaces, a honeycomb structure, or other mesh structure having a plurality of interwoven hollow spaces.

The hollow spaces 38a, 38b, 38c can be designed to reduce the overall mass of the transducer 300 components. As a result, the ultrasonic transducer 300 can be used at or over a desired frequency range. The one or more hollow spaces 38a, 38b, 38c can have various sizes and/or shapes. For example, FIG. 3C shows the hollow spaces 38b in the head mass 30 having a first volume, and the hollow space 38c having a second volume that can be smaller than the first volume. The hollow spaces 38b, 38c in the head mass can include a plurality of concentric cavities, the interior cavities having a larger volume than the most exterior cavity 38c. It is understood that each of the concentric cavities could have a different volume. For example, the volume of the cavities can reduce in size from the cavity closest to the center of the head mass 30 to the cavity closest to the exterior surface of the head mass 30. Varying the size, shape, and spacing of the hollow spaces 38a, 38b, 38c allows for tuning of the transducer 300 for use at a desired frequency or range of frequencies using a desired material or combination of materials.

Figures 4A, 4B, 4C:
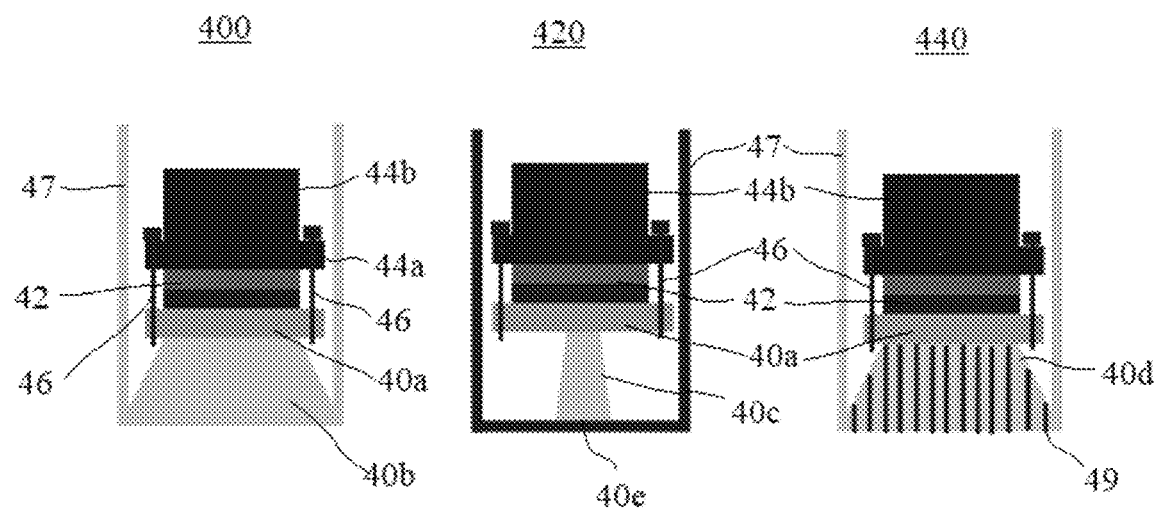
FIG. 4A is a cross-sectional view of a fourth embodiment of an ultrasonic transducer for flow measurement having an external shell.
FIG. 4B is a cross-sectional view of a fifth embodiment of an ultrasonic transducer for flow measurement having an external shell.
FIG. 4C is a cross-sectional view of a sixth embodiment of an ultrasonic transducer for flow measurement having an external shell.

FIG. 4A illustrates an embodiment of an ultrasonic transducer 400 having a shell 47 that surrounds the head mass 40a, 40b, spanning element 46 and tail mass 44a, 44b. As shown in FIG. 4A, the head mass 40a, 40b includes a proximal constant diameter portion 40a and a conical tapered portion 40b that can increases in diameter from the proximal constant diameter portion 40a to the distal end. The shell 47 can be bonded to the conical tapered portion 40b or can be integrally formed therewith during an Additive Manufacturing process. The shell 47 can extend proximally from the conical tapered portion 40b to cover and can surround the components of the transducer 400. A proximal portion of the shell 47 can be configured to connect with other portions of the transducer 400 to seal the components therein.

The tail mass 44a, 44b can include a distal constant diameter portion 44a and a proximal constant diameter portion 44b. The distal constant diameter portion 44a can include one or more holes or openings to accept one or more spanning elements 46. The one or more spanning elements 46 can join to the proximal constant diameter portion 40a of the head mass. The one or more spanning elements 46 may be spaced around the perimeter of the transducer 400 at equal distances. While two spanning elements 46 are shown in FIG. 4A, it is understood that three, four, five, six or more spanning elements 46 can be used to connect the components of the transducer 400 together. The positioning of the spanning elements 46 on the exterior of the components can allow the tail mass 44a, 44b to be joined to the head mass 40a, 40b without the use of an internal spanning element. This can allow for piezoelectric discs 42 having a solid cross-section to be configured between the head mass 40a, 40b and the tail mass 44a, 44b rather than piezoelectric rings which can surround the spanning element, as shown in FIGS. 2A, 2B, 3A, 3B, and 3C.

The ultrasonic transducer 420 shown in FIG. 4B is identical to the embodiment illustrated in FIG. 4A except for the conical tapered portion of the head mass 40c. Like the conical tapered portion 40b, the conical tapered portion 40c in FIG. 4B can taper from a smaller diameter portion to a larger diameter portion. However, the head mass 40c can include a distal face 40e having a diameter that is less than the diameter of the piezoelectric discs 42.

FIG. 4C illustrates the conical tapered portion 40d of the head mass as having a plurality of hollow portions or cavities 49. Cavities 49 can include various volumes and arrangements. The cavities 49 can be spaced throughout the conical tapered portion 40d at regular intervals or spaced irregularly. The cavities 49 may include a plurality of linear hollow volumes, or can take the form of a plurality of concentric cylindrical cavities. The cavities 49 may be defined as separate structures, or may be fluidly connected to one another. While the conical tapered portion 40d is shown having a plurality of cavities, it is understood that one or more cavities can be formed in the proximal constant diameter portion 40a of the head mass, or the distal constant diameter portion 44a or the proximal constant diameter portion 44b of the tail mass. The various head mass 40b, 40c, 40d configurations can allow for the transducers to be tuned to a specific sensitivity and frequency when formed from one or more of the materials disclosed above.

The embodiments set forth above can allow for the tuning of an ultrasonic transducer to a specific sensitivity and frequency for a desired application during manufacture. However, once the transducer is formed, it is impossible to adjust the parameters of the transducer. The embodiments disclosed in FIGS. 5A, 5B, 6A, and 6B are capable of changing the configuration of the head mass in real time to optimize the performance of the transducer based on real time feedback. Such a configuration allows for real time tuning to a desired bandwidth during operation of the transducer.

Figure 5A:
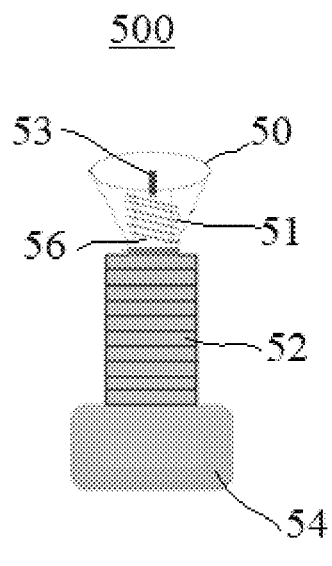
FIG. 5A is a schematic illustration of an ultrasonic transducer for flow measurement having a shape changing element in a first configuration in accordance with a seventh embodiment.
Figure 5B:
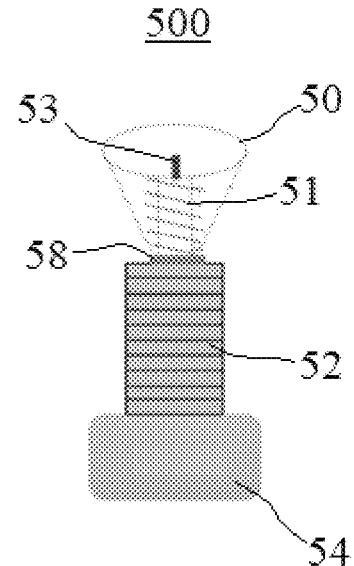
FIG. 5B is a schematic illustration of the ultrasonic transducer of FIG. 5A having the shape changing element in a second configuration.

FIG. 5A illustrates an ultrasound transducer 500 having a tail mass 54, and piezoelectric crystals 52 stacked on a spanning member 56 as described in the above embodiments. However, the head mass 50 can be configured to have a portion having a first contracted configuration as shown in FIG. 5A and a second expanded configuration as shown in FIG. 5B. In some embodiments, the head mass 50 can include a shape memory element 51 that includes a first overall length at a first temperature, and a second overall length at a second temperature. In some embodiments, the shape memory element 51 can be configured to move within the head mass, such as within a channel or opening in the head mass 50. In this instance, the shape memory element 51 can be the only portion of the head mass 50 that can change shape. In other embodiments, the shape memory element 51 can be configured to move all or a portion of the head mass 50 upon actuation.

The shape memory spring 51 can be actuated by a heating element 53 that can be attached to the spanning element 56. In some embodiments, the heating element 53 can be positioned within the spanning element 56. The heating element 53 can take the form of a resistive heater or other heat source that is capable of raising the temperature of the shape memory spring 51 to effect a change in the shape memory element 51.

Figure 5C:
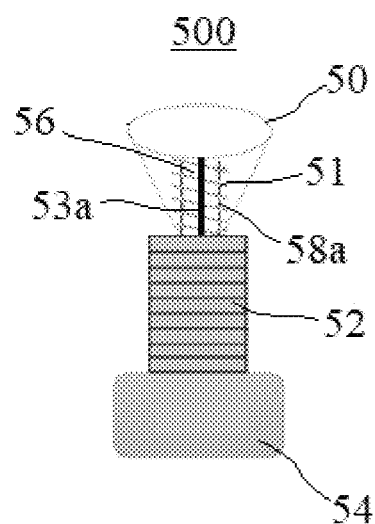
FIG. 5C is a schematic illustration of the ultrasonic transducer of FIG. 5A having the heating element external to the spanning element.

In some embodiments, the heating element 53 can be positioned within the spanning element and configured to heat the spanning element 56, which in turn transfers heat to the shape memory element 51. In other embodiments, the spanning element 56 can be surrounded by a thermal insulator 58 to prevent heat from transferring to the piezoelectric crystals 52. In other embodiments, as shown in FIG. 5C, a heating element 53a may be positioned over a thermal insulator 58a that surrounds the spanning element 56 to heat the shape memory element 51 directly to induce a change in the shape memory element 51. In some embodiments, the shape memory element 51 can include more than one spring, and can also include another form, such as a helical structure, woven structure, or braided structure that is adapted to move from a contracted configuration to an expanded configuration or vice versa when actuated.

The shape memory element 51 can be formed from a shape memory alloy or a polymer. For example, the shape memory element 51 can be formed of Nitinol or other nickel-titanium alloys, or copper-aluminum-nickel alloys or from a suitable shape memory polymer, such as polytetrafluoroethylene, polylactide, and ethylene-vinyl acetate. The shape memory element 51 can be configured to have a one-way memory effect, or a two-way memory effect.

While the spanning element 56 is shown in FIGS. 5A and 5B as being an internal element, it is understood that an external spanning member such as described in FIGS. 4A-4C could be used with the ultrasound transducer 500.

Figure 6A:
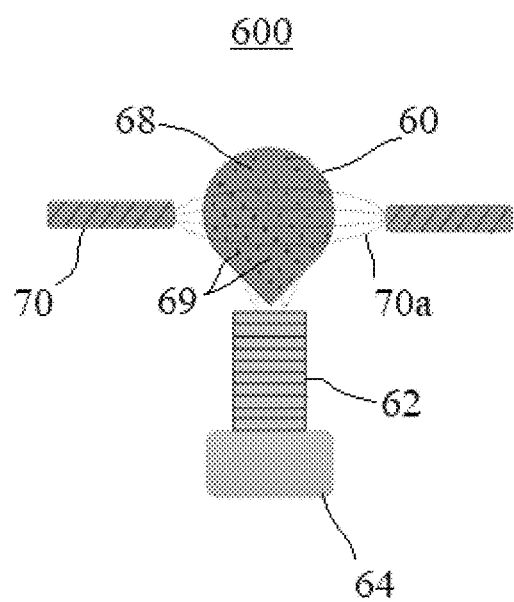
FIG. 6A is a schematic illustration of an ultrasonic transducer for flow measurement having a magneto-rheological fluid based head mass having magnetic particles aligned in accordance with an eight embodiment.

FIG. 6A illustrates another embodiment of an ultrasound transducer 600 where the head mass 60 can include a first configuration and a second configuration that is different from the first configuration. The first configuration can include a first arrangement of a head mass and the second configuration can include a second arrangement of the head mass. The first and second configurations may be different by a physical arrangement of components of the head mass or by different properties induced within the head mass. For example, the first configuration may include the head mass in a first position, and the second configuration may include the head mass in a second position. Additionally, the first configuration may include a head mass having a first viscosity and the second configuration may include the head mass having a second viscosity.

The ultrasound transducer 600 includes a tail mass 64, and piezoelectric crystals 62 stacked on a spanning member 66 such as described previously. In this embodiment, the head mass 60 can include a magnetorheological fluid 68 that when subjected to a magnetic field changes properties, such as a change in the apparent viscosity of the fluid 68. The magnetorheological fluid 68 can include a type of carrier fluid, such as an oil, and includes a plurality of magnetic particles 69 suspended in the magnetorheological fluid 68. The magnetic particles 69 can be micrometer or nanometer scale particles such as spheres or ellipsoids that can be suspended within the magnetorheological fluid 68 and distributed randomly in suspension under normal circumstances. When a magnetic field 70a is applied, such as by an electromagnet or magnetization coil 70, the magnetic particles 69 can align themselves along the lines of magnetic flux.

Figure 6B:
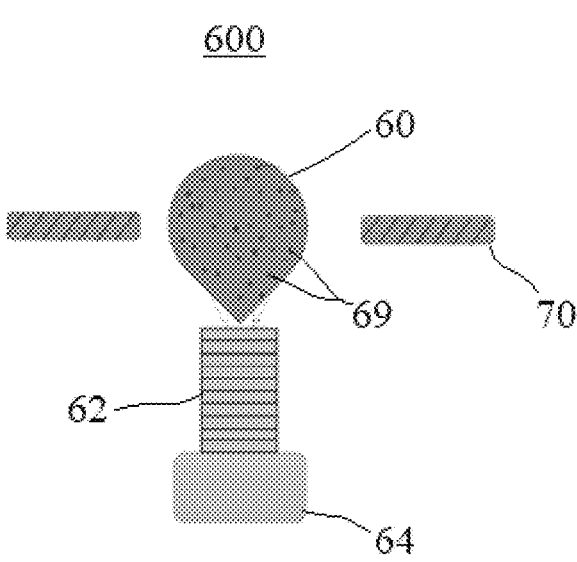
FIG. 6B is a schematic illustration of the ultrasonic transducer of FIG. 6A having the magnetic particles unaligned.

As shown in FIG. 6A, a first configuration of the head mass 60 includes magnetic particles 69 aligned as a result of a magnetic field 70a being applied. As shown in FIG. 6B, a second configuration of the head mass 60 includes unaligned magnetic particles 69. The electromagnet or magnetization coil 70 can be configured to apply a variety of magnetic fields 70a to the magnetorheological fluid 68. In some embodiments, more than one electromagnet or magnetization coil 70 may be arranged to apply a magnetic field 70a to the magnetorheological fluid 68. The electromagnet or magnetization coil 70 can be configured to apply a plurality of magnetic fields 70a that can vary in strength or orientation to create various lines of magnetic flux to which the magnetic particles 69 can be aligned, thus changing the properties of the head mass 60 in real time to adjust performance of the ultrasound transducer 600. For example, some application may require a low bandwidth such as in a high $CO_2$ environment, but then need to increase the bandwidth in a low flow environment. By adjusting the magnetic field 70a applied to the head mass 60, the ultrasound transducer can be tuned during use.

Figure 7:
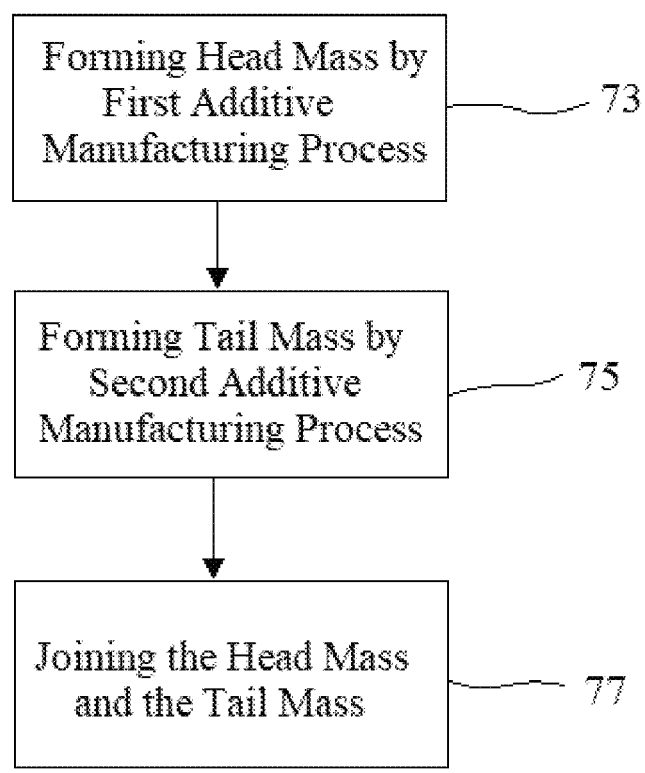
FIG. 7 is a flow chart representing a method of making an ultrasonic transducer.

A method of making an ultrasonic transducer 700 is illustrated in FIG. 7. The method 700 can include forming a head mass utilizing a first process of additive manufacturing as shown in step 73. The additive manufacturing process may result in the formation of a cavity or void or a plurality of cavities or voids in the head mass. The additive manufacturing process may result in a recess or channel into which a shape changing element such as discussed in FIGS. 5A-5C may be positioned. The head mass can include any desired shape such as a tapered shape as shown in FIGS. 2A and 2B or a cylindrical shape as discussed in FIGS. 3A-3C. The head mass may be formed of one or more materials as set forth above. The first additive manufacturing process may include one or more of Fused Deposition Modeling (FDM), Stereolithography (SLA), Direct Ink Writing (DIW), Powder Bed Fusion (PBF), Aerosol Jetting (AJ), and Lithography.

The method 700 can include forming a tail mass utilizing a second process of additive manufacturing as shown in step 75. The second additive manufacturing process may result in the formation of a cavity or void or a plurality of cavities or voids in the tail mass. The tail mass can include any desired shape such as a tapered shape or a cylindrical shape as discussed in FIGS. 3A-3C. The tail mass may be formed of one or more materials as set forth above. The second additive manufacturing process may include one or more of Fused Deposition Modeling (FDM), Stereolithography (SLA), Direct Ink Writing (DIW), Powder Bed Fusion (PBF), Aerosol Jetting (AJ), and Lithography.

Step 77 illustrates the step of joining the head mass and the tail mass by a spanning element. As discussed previously, the spanning element may include a structure passing though the head mass, piezoelectric crystals, and the tail mass to connect the components of the transducer together. In some embodiments, the connecting element may be integrally formed with the head mass or the tail mass. In other embodiments, the connecting element can be placed outside of the components of the transducer, or surround and encase the components. Joining the head mass and the tail mass can include threadably connecting the head mass and the tail mass via the spanning element, or boding the head mass, the tail mass, and the spanning element together.

The improved system, devices, and methods described herein addresses the technical problem of coupling various components of ultrasonic transducers and tuning ultrasonic transducers for use in flow meters in specific environments. By creating components of the transducers using Additive Manufacturing, the overall mass of the components can be reduced, allowing for greater sensitivity, increased output using less excitation voltage, and specific tuning of the transducer for use at or over a desired frequency range. The use of a spanning element to couple components of the transducer together alleviates problems with boding agents weakening over time.

Exemplary embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above described elements in all possible variations thereof is encompassed by the disclosure unless otherwise indicated herein or otherwise clearly contradicted by context.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

What is claimed is:

1. An ultrasonic transducer, comprising:
a head mass formed of a first material;
a tail mass formed of a second material;
a spanning element connecting the head mass and the tail mass, wherein the spanning element comprises a bolt located within or outside of at least one piezo crystal; and
the at least one piezo crystal positioned along the element; wherein, the head mass, tail mass, or spanning element includes at least one cavity.

2. The ultrasonic transducer of claim 1, further comprising a shell surrounding the head mass.

3. The ultrasonic transducer of claim 1, wherein the at least one cavity comprises a plurality of concentric cavities.

4. The ultrasonic transducer of claim 1, wherein the head mass comprises a conical shape having a distal diameter greater than a proximal diameter.

5. The ultrasonic transducer of claim 1, wherein at least one of the head mass and the tail mass includes a protrusion for receiving the bolt.

6. The ultrasonic transducer of claim 1, wherein the first material is different from the second material.

7. The ultrasonic transducer of claim 1, wherein the head mass is formed from the first material using a first process of additive manufacturing, and the tail mass is formed from the second material using a second process of additive manufacturing.

8. The ultrasonic transducer of claim 1, wherein the at least one cavity includes a plurality of cavities.

9. The ultrasonic transducer of claim 8, wherein the plurality of cavities include different volumes.

10. An ultrasonic transducer, comprising:
a head mass;
a shape changing element coupled to the head mass;
a tail mass;
a spanning element connecting the head mass and the tail mass; and at least one piezo crystal positioned along the element;
wherein the head mass is configured to have a first configuration and a second configuration different from the first configuration.

11. The ultrasonic transducer of claim 10, wherein in the first configuration the shape changing element comprises a contracted configuration at a first temperature and in the second configuration the shape changing element comprises an expanded configuration at a second temperature.

12. The ultrasonic transducer of claim 10, wherein the head mass comprises a fluid and magnetic particles dispersed within the fluid.

13. The ultrasonic transducer of claim 12, wherein the first configuration comprises the magnetic particles aligned.

14. The ultrasonic transducer of claim 12, wherein the second configuration comprises the magnetic particles unaligned.

\* \* \* \* \*